3,186,261
TREPANNING DRILL MACHINE FOR INDUSTRIAL USE
James E. Howard, 5095 Cherokee St., and William I. Gibbs, Rte. 1 S., both of Pocatello, Idaho
Filed July 23, 1962, Ser. No. 211,725
3 Claims. (Cl. 77—13)

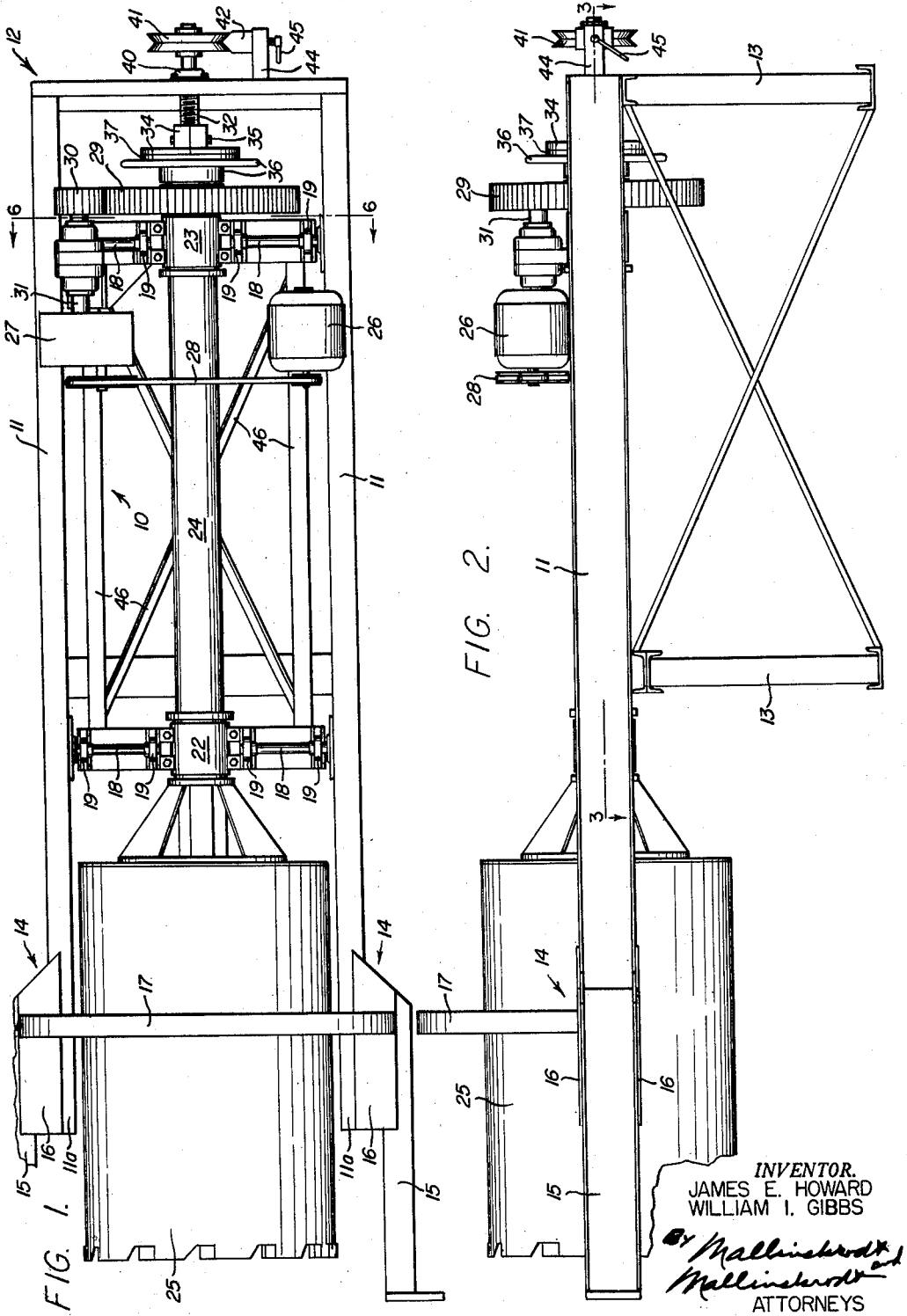

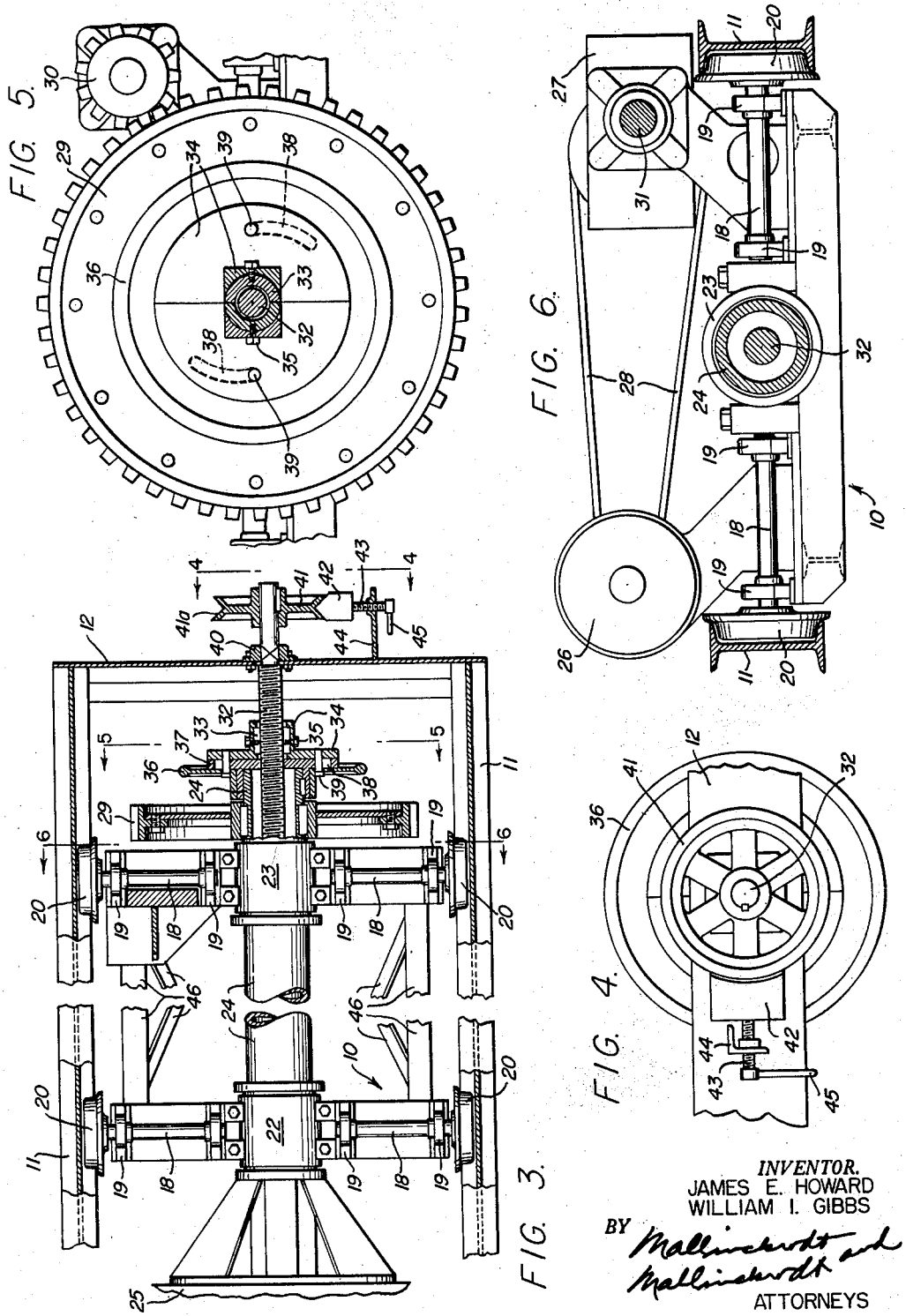

The invention is a drill machine of trepanning or core type intended especially for industrial use. It was developed primarily for the purpose of facilitating the removal of tap hole areas in certain metallurgical furnaces, for example, the electric furnaces utilized in the production of elemental phosphorous, in accordance with the method disclosed and claimed in our copending application for patent Serial Number 198,091, filed May 28, 1962, and entitled "Method of Repairing Tap Hole Areas of Metallurgical Furnaces."

Although the aforementioned method may be carried out in various ways, there was a need for a heavy duty trepanning or core drill machine of simple yet effective construction for precisely drilling and extracting a circular section, containing the tap hole, from the furnace wall while the furnace remains too hot for close drilling approach by workmen.

A feature of the invention in meeting this need is the journaling of a trepanning drill on preferably a rail-mounted carriage, so drill and carriage advance and retract as a unit, and the provision of a drill-advancing screw assembly having one component fixed to the drill for longitudinal movement therewith and another meshing component fixed in a stationary position relative to the drill and its carriage, whereby rotation of the drill positively advances its screw component and itself at a rate determined by the number of threads per unit length.

It is preferred that the drill have an elongate hollow shank and that the stationary component of the screw assembly be an elongate screw extending axially of and within such hollow shank, the component which is fixed to the drill for movement therewith being a nut structure arranged for meshing engagement with the screw.

Another feature of the invention is the making of the nut structure in sections and the provision of means for retracting such sections so as to disengage nut from screw when it is desired to retract the drill and its carriage upon completion of the drilling operation. In this way retraction can be quickly and easily accomplished manually by merely moving the carriage backwardly on its track.

An additional feature of importance is overload protection for the drill, this being advantageously accomplished by journaling the screw in a stationary support and providing a simple brake for the screw which can be set at any desired degree of resistance to screw rotation.

In this way, the drill—though large and heavy—can be effectively powered by a relatively small electric motor or internal combustion engine mounted on the carriage and connected in drive relationship with the shank of the drill by a speed reducer and simple gearing.

It is to be understood that the novel structural features of the machine may be employed in any analogous machine where a generally similar result is desired, without going beyond the intended scope of the invention.

A specific embodiment of trepanning drill machine for removing tap hole areas of metallurgical furnaces and representing what is presently regarded as the best mode of carrying out the inventive concepts in actual practice is illustrated in the accompanying drawings. From the detailed description of this machine other more specific objects and features of the invention will become apparent.

In the drawings:
FIG. 1 is a top plan view representing the machine with its drill in a retracted position, a minor portion being broken out for convenience of illustration;
FIG. 2, a side elevation;
FIG. 3, a fragmentary horizontal section taken on the line 3—3 of FIG. 2 and drawn to a somewhat larger scale;
FIG. 4, a fragmentary end elevation taken on the line 4—4 of FIG. 3 and drawn to a still larger scale;
FIG. 5, a fragmentary view in vertical section taken on the line 4—4 of FIG. 3;
FIG. 6, a vertical section taken on the line 6—6 of FIGS. 1 and 3 and drawn to a larger scale.

Referring to the drawings:
In the form illustrated, the machine comprises a carriage 10 mounted for forward and backward movement on rails 11, which, in this instance, are structural steel I-beams serving as longitudinal top stringers of a stationary supporting framework 12 having legs 13. Rails 11 extend forwardly of the supporting framework proper, as at 11a, FIG. 1, to provide for aligned securement of such framework to the walls of the particular furnace concerned, in the manner illustrated in our aforereferred to copending application Serial Number 198,091.

A work-attaching structure 14 is rigidly fastened to the forward ends of rails 11 in any suitable manner, as by welding, to enable the aligned securement to be handily made at such times as the drill machine is installed in working position at the furnace.

Such structure includes a pair of attachment brackets 15 rigidly secured to the rails 11, respectively, by means of respective sets of plates 16 welded in place, and an arched crosspiece 17 interconnecting such brackets and the forward ends of the rails. The brackets 15 are bolted or otherwise suitably secured to the work, conveniently by means of corresponding bracket members (not shown) rigidly secured to and projecting from the outer wall of the furnace in proper relationship with the tap hole.

Carriage 10 includes a structural framework, FIGS. 1 and 3, mounting sets of front and rear axles 18 by means of respective sets of bearings 19. Wheels 20 carried by such axles ride between the upper and lower flanges of the I-beam rails 11.

Journaled by front and rear bearings 22 and 23 is the elongate and hollow shank 24 of a trepanning or core drill 25, which is rotated by drive connection with an electric motor 26 mounted on the carriage. Such drive connection includes a speed reducer 27, driven by a belt 28 from the drive pulley of motor 26, and a gear 29 keyed to drill shank 24, see FIG. 3, and driven by a pinion gear 30, FIG. 1, on output shaft 31 of the speed reducer.

For advancing the drill automatically at a proper rate during the drilling operation, there is provided a screw assembly, which includes a screw 32, FIG. 3, extending axially of and within drill shank 24 from anchorage in stationary frame 12, and, arranged for meshing with such screw, threaded means in the form of a split nut 33 fixed to and carried by the drill shank. Such split nut is held in a similarly split, flanged casing 34, FIGS. 3 and 5, by screws 35, and is opened and closed relative to screw 32 by means of a handwheel 36 having a hub journaled on a corresponding hub of an end flange member 37 which is secured to drill shank 24 by keying. By reason of this keying, member 37 is constrained to rotate with drill 25.

Handwheel 36 and flange member 37 have registering sets of eccentric slots 38, FIG. 5, through which extend respective pins 39. Such pins are fast in the flange of nut casing 34 and are headed at handwheel 36 as indicated, so that rotation of the handwheel clockwise in FIG. 5 will open split nut 33 with respect to screw 32 while reverse rotation will return it to the closed position shown.

In the closed position of split nut 33, the meshing thereof with screw 32 will force drill 25 to advance at a uniform rate during the rotation of such drill and its shank 24. Following the drilling operation, operation of handwheel 36 to open such split nut and thereby bring it out of mesh with screw 32 will permit retraction of the drill by merely pushing the entire carriage backwardly.

Screw 32 is advantageously journaled in stationary frame 12, as at 40, as part of an overload protective arrangement for the drill. Such arrangement is desirably in the form of a manually settable brake for establishing a predetermined degree of resistance to rotation of screw 32.

As illustrated, FIGS. 3 and 4, a wheel 41 having a V-grooved rim 41a is keyed on the protruding end of drill-advancing screw 32, and a V-shaped brake shoe 42 is arranged to be pressed into the groove. Brake shoe 42 is supported and adjusted in position by means of a shank 43 threaded through a suitable boss in a bracket arm 44 which extends from fixed securement to stationary frame 12. Brake tension is adjusted by turning handle 45 to either tighten or loosen engagement of brake shoe 42 with brake wheel or drum 41.

Ordinarily, a crane will be employed to move the machine from one working location to another.

Whereas there is here illustrated and specifically described a certain preferred embodiment which we presently regard as the best mode of carrying out the invention, it should be understood that various changes may be made without departing from the inventive concepts particularly pointed out and claimed herebelow.

We claim:

1. A drill machine, comprising a carriage; a drill journaled in fixed position on the carriage so as to be advanceable therewith toward and retractable therewith from the surface to be drilled, said drill having a rearwardly-extending hollow shank; a drill-advancing screw extending axially of and within said shank; threaded means fixedly carried by said shank and arranged to mesh with the screw, said threaded means comprising a split nut having separable sections movable toward and away from one another to engage and disengage, respectively, the threads of the screw; means for moving said sections toward and away from one another to effect advancement of the drill and to permit retraction of said drill, respectively; stationary means for holding said screw in fixed position, said stationary means including a support journaling the screw, said support being fixed in position relative to the carriage, and overload means exerting on said screw a predetermined degree of resistance to rotation, whereby said screw will rotate with the drill and halt advancement of the drill when the latter meets resistance greater than said predetermined degree; and means for rotating the drill to advance it along the screw.

2. The drill machine of claim 1, further including a pair of tracks; means for fastening one end of said pair of tracks to a surface to be drilled; and carriage wheels supporting the hollow shank on said tracks.

3. The drill machine of claim 2, wherein the means for rotating the drill to advance it along the screw includes a motor mounted on and carried by the carriage.

References Cited by the Examiner

UNITED STATES PATENTS

| | | | |
|---|---|---|---|
| 255,449 | 3/82 | Pedrick | 77—34.4 |
| 920,011 | 4/09 | Boggs | 77—34.4 |
| 1,216,284 | 2/17 | Cash | 77—34.4 |
| 1,276,251 | 8/18 | Mullen | 266—42 |
| 1,702,679 | 2/29 | Wilson | 77—34.4 |
| 2,240,795 | 5/41 | Morgan et al. | 77—34.4 |

WILLIAM W. DYER, Jr., *Primary Examiner.*
JOHN C. CHRISTIE, *Examiner.*